Patented Sept. 7, 1954

2,688,612

UNITED STATES PATENT OFFICE 2,688,612

PREPARATION OF PHOSPHORUS SULFIDE-HYDROCARBON REACTION PRODUCTS AND REMOVAL OF INORGANIC PHOSPHOROUS ACIDS THEREFROM

Roger W. Watson, Highland, Ind., assignor to Standard Oil Company, Chicago, Ill., a corporation of Indiana No Drawing. Application December 22, 1950, Serial No. 202,409

14 Claims. (Cl. 260—139)

The present invention is directed to improvements in the preparation of neutralized reaction products of a phosphorus sulfide and an olefin hydrocarbon, and more particularly is directed to the preparation of substantially inorganic salt-free neutralized reaction products of a phosphorus sulfide and an olefin polymer which product is adapted for use as a lubricant additive.

It has heretofore been found that certain reaction products of a phosphorus sulfide and a hydrocarbon, particularly an olefin or an olefin polymer, when added in small amounts to a hydrocarbon oil, such as a mineral oil, is effective in inhibiting the formation of sludge and/or varnish-like deposits on the valves, piston rings, etc., of internal combustion engines in which they are employed. These additives are the subject matter of United States Patents Nos. 2,316,080 and 2,316,082, issued to Clarence M. Loane and James W. Gaynor April 6, 1943. While lubricant additives of the type described in these patents have proven very satisfactory for use under most conditions, it has recently been observed in some cases that when used in internal combustion engines operating under unusually high temperature conditions and/or used in internal combustion engines, particularly diesel engines, employing motor fuels of high sulfur content, undesirable wear and engine deposits have been encountered. While these difficulties appear to be the exception rather than the rule, steps were taken to overcome such difficulties. It was found that a contributory factor was the presence of relatively large amounts of salts of inorganic phosphorus acids formed in the hydrolysis of the reaction products of the phosphorus sulfide and the hydrocarbon.

It is an object of the present invention to provide a method of preparing improved neutralized reaction products of a phosphorus sulfide and a hydrocarbon. Another object of the present invention is to provide a method of preparing neutralized reaction products with a phosphorus sulfide and a hydrocarbon substantially free of salts of inorganic phosphorus acids. Still another object of the invention is to provide an improved method of removing salts of inorganic phosphorus acids from neutralized reaction products of a phosphorus sulfide and an olefin polymer. Still another object of the invention is to provide a neutralized reaction product of a phosphorus sulfide and an olefin hydrocarbon which is substantially free of salts of inorganic phosphorus acids.

In the preparation of the reaction product of a phosphorus sulfide and a hydrocarbon, hydrolysis takes place with the resultant formation of inorganic phosphorus acids which upon neutralization, produced salts of such inorganic phosphorus acids. It has recently been found that the presence of salts of inorganic phosphorus acids in lubricant compositions containing as an additive the neutralized reaction products of a phosphorus sulfide and a hydrocarbon caused excess wear, valve burning and other deleterious effects under certain operating conditions, particularly with diesel engines.

In accordance with the present invention neutralized reaction products of a phosphorus sulfide and a normally liquid hydrocarbon, particularly olefin polymers substantially free of salts of inorganic phosphorus acids are prepared by reacting such hydrocarbons with a phosphorus sulfide, particularly phosphorus pentasulfide, hydrolyzing the resultant reaction product at a temperature of from about 220° F. to about 500° F., and preferably from about 300° F. to about 400° F., contacting the hydrolyzed reaction product, either before or after neutralization, with an alkaline adsorbent material, such as Attapulgus clay, and removing the clay from the clay-treated product. Examples of suitable adsorbent materials which can be used for the purposes of the present invention are Attapulgus clay, Floridin, Filter Cel, fuller's earth, bentonite, magnesite, bauxite and other similar diatomaceous earth materials. The hydrolyzed reaction product of the phosphorus sulfide and the hydrocarbon which may be either neutralized or unneutralized, is contacted with from about 1% to about 30%, preferably from about 5% to about 20%, of the adsorbent material, such as Attapulgus clay, at a temperature of from about 100° F. to about 500° F., and preferably from about 250° F. to about 400° F., until a sample of the contacted material indicates the removal of substantially all of the inorganic phosphorus acids formed during the hydrolysis. The contacting time is not critical and can be varied over a wide range; usually a contacting time of from about one-quarter of an hour to about twenty hours, and preferably from about one-half hour to about six hours, is sufficient to obtain the desired result.

The phosphorus sulfide-hydrocarbon reaction product is neutralized either before being hydrolyzed or after clay-contacting of the hydrolyzed reaction product with a basic reagent, such as a basic alkali metal compound or a basic alkaline earth compound, such as for example, sodium hydroxide, potassium hydroxide, lithium hydroxide, calcium hydroxide, barium hydroxide, calcium oxide, barium oxide, magnesium oxide or magnesium hydroxide, or heavy metal hydroxides, such as zinc hydroxide, tin hydroxide or basic nitrogen compounds, such as ammonia, amines, quarternary alkyl ammonium hydroxides.

In the preparation of the phosphorus sulfide-hydrocarbon reaction product the hydrocarbon is reacted with a phosphorus sulfide, such as $P_2S_3$, $P_4S_3$, $P_4S_7$, or other phosphorus sulfides, and preferably phosphorus pentasulfide, $P_2S_5$.

The hydrocarbon constituent of this reaction is preferably a mono-olefin hydrocarbon polymer resulting from the polymerization of low molecular weight mono-olefinic hydrocarbons or iso-mono-olefinic hydrocarbons such as propylenes, butylenes and amylenes or the copolymers obtained by the polymerization of hydrocarbon mixtures containing isomono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride, or other similar halide catalysts of the Friedel-Crafts types.

The polymers employed are preferably mono-olefin polymers or mixtures of mono-olefin polymers and isomono-olefin polymers having molecular weights ranging from about 500 to about 50,000 or more, and preferably from about 600 to about 10,000. Such polymers can be obtained for example by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts type, such as for example, boron fluoride, aluminum chloride, and the like. In the preparation of these polymers, we may employ for example, a hydrocarbon mixture containing isobutylene, butylenes, and butanes recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes, together with butanes and some $C_3$ and $C_5$ hydrocarbons at a temperature between about 0° F. and 30° F. in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity such as for example from about 80 seconds to about 2000 seconds Saybolt Universal at 210° F.

Another suitable polymer is that obtained by polymerizing in the liquid phase a hydrocarbon mixture comprising substantially $C_3$ hydrocarbons in the presence of an aluminum chloride-complex catalyst. The catalyst is preferably prepared by heating aluminum chloride with isooctane. The hydrocarbon mixture is introduced into the bottom of the reactor and passed upwardly through the catalyst layer, while a temperature of from about 50° F. to about 110° F. is maintained in the reactor. The propane and other saturated gases pass through the catalyst while the propylene is polymerized under these conditions. The propylene polymer can be fractionated to any desired molecular weight, preferably from about 500 to about 1000, or higher.

Other suitable polymers are those obtained by polymerizing a hydrocarbon mixture containing about 10% to about 25% isobutylene at a temperature of from about 0° F. to about 100° F., and preferably from about 0° F. to about 32° F. in the presence of boron fluoride. After the polymerization of the isobutylene together with a relative minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to viscous, oily material and contains polymers having molecular weights ranging from about 500 to about 2000, or higher. The polymers so obtained may be used as such, or the polymer may be fractionated under reduced pressure into fractions of increasing molecular weights and suitable fractions obtained reacted with the phosphorus sulfide to obtain the desired reaction products. The bottoms resulting from the fractionation of the polymer which may have Saybolt Universal viscosities at 210° F. ranging from 50 seconds to about 10,000 seconds are well suited for the purpose of the present invention.

Essentially paraffinic hydrocarbons such as bright stock residuums, lubricating oil distillates, petrolatums or paraffin waxes may be used. There can also be employed the condensation products of any of the foregoing hydrocarbons usually through first halogenating the hydrocarbons with aromatic hydrocarbons in the presence of anhydrous inorganic halides, such as aluminum chloride, zinc chloride, boron fluoride and the like.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils.

Other preferred olefins suitable for the preparation of the hereindescribed phosphorus sulfide reaction products are olefins having at least 20 carbon atoms in the molecule of which from about 13 carbon atoms to about 18 carbon atoms, and preferably at least 15 carbon atoms are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

The olefins obtained by dehalogenation of long chain alkyl halides are preferably those obtained by dehydrohalogenation of monohalogenated waxes, such as for example, those obtained by dehydrochlorination of monochloroparaffin wax. The alkyl halides are decomposed to yield olefins according to the reaction $$C_nH_{2n+1}X \rightarrow HX + C_nH_{2n}$$

in which $n$ is a whole number, preferably 20 or more, and X is a halogen. It is preferred to employ paraffin waxes having at least about 20 carbon atoms per molecule, and melting points upwards from about 90° F. to about 140° F.

To obtain the halogenated paraffin wax, for example, chlorinated paraffin wax, chlorine is introduced into the wax, maintained in a molten state, until the wax has a chlorine content of from about 8% to about 15%. The chlorinated wax product is a mixture of unchlorinated wax, monochlorowax and polychlorowax. This chlorinated product may be used as such, but it is advantageous to use the substantially monochlorowax fraction. The monochlorowax fraction can be segregated from the unchlorinated wax and the polychlorowax fractions by taking advantage of the differences in the melting points of the various fractions, since the melting point of the wax varies with the extent of chlorination, i. e., the melting point of the unchlorinated wax is greater than that of the monochlorowax, and the melting point of the latter is greater than that of the polychlorowax. Thus, the monochloroparaffin wax can be separated from the unchlorinated and the polychloroparaffin wax fractions by means such as sweating, fractional distillation, solvent extraction, solvent precipitation and fractional crystallization.

The high molecular weight olefins are obtained by removing the halogen as hydrogen halide from the halogenated paraffin wax. For example, the corresponding olefin is obtained from the monochloro-paraffin wax by removing the chlorine from the latter as hydrogen chloride. The monochlorowax can be dehydrochlorinated by heating to a temperature of from about 200° F. to about 600° F. in the presence of a dehydrochlorinating agent, such as an alkali metal hydroxide or an alkaline earth metal hydroxide or oxide. Other alkaline inorganic or organic materials can also be used. The chlorine can also be removed from the chlorowax by heating the same for a prolonged period in the absence of any dehydrochlorinating agent. After the dehydrohalogenation has been completed the olefin so obtained can be further purified by removing the dehydrohalogenating agent by means of filtration or by other suitable means.

As a starting material there can be used the polymer or synthetic lubricating oil obtained by polymerizing the unsaturated hydrocarbons resulting from the vapor phase cracking of paraffin waxes in the presence of aluminum chloride which is fully described in United States Patents Nos. 1,955,260, 1,970,402 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed. Also contemplated within the scope of this invention is the treatment with phosphorus sulfide of the polymers resulting from the voltolization of hydrocarbons as described for example in United States Patents Nos. 2,197,768 and 2,191,787.

Also contemplated within the scope of the present invention are the reaction products of a phosphorus sulfide with an aromatic hydrocarbon, such as for example, benzene, naphthalene, toluene, xylene, diphenyl and the like, or with an alkylated aromatic hydrocarbon, such as for example, benzene having an alkyl substituent having at least four carbon atoms and preferably at least eight carbon atoms, such as a long chain paraffin wax.

The hydrocarbon, such as for example, an olefin polymer of the desired molecular weight is reacted with from about 1% to about 50%, preferably from about 5% to about 25% of a phosphorus sulfide, e. g., $P_2S_5$, at a temperature of from about 200° F. to about 600° F., particularly at a temperature of from 400° F. to about 500° F., while maintaining a non-oxidizing atmosphere, such as for example, an atmosphere of nitrogen above the reaction mixture. The reaction mixture is then hydrolyzed by steaming or other suitable means, at a temperature of from about 220° F. to about 500° F., and preferably at a temperature of from about 300° F. to about 400° F. During the hydrolysis step, it is desirable to control the evolution of heat by suitable means to maintain a temperature below about 420° F. Due to the formation of inorganic phosphorus acids and organic phosphorus acids formed by the hydrolysis, the acidity of the hydrolyzed material is markedly increased, often reaching as much as 160 milligrams of KOH per gram of product, and higher.

The hydrolyzed reaction product is then contacted or mixed with from about 1% to about 30% of a suitable adsorbent clay, such as Attapulgus clay, and the mixture agitated, such as by blowing with an inert gas for a period of from about one-half hour to about six hours while maintaining a temperature of from about 250° F. to about 400° F. To facilitate adequate mixing and contacting it is desirable to thin or dilute the mixture by the addition of a suitable diluent; where the reaction product is to be used ultimately as a lubricant oil additive the diluent may be a hydrocarbon oil of suitable viscosity. After being contacted for the desired length of time at the selected temperature the mixture is then filtered by suitable means for example by means of a filter press and a filtrate substantially free of inorganic phosphorus acid obtained.

The filtrate so obtained can be used as such for various purposes; however, for use as lubricant additive the filtrate should be neutralized with a suitable alkaline reagent, such as a hydroxide, oxide, carbonate or sulfide of an alkali metal or alkaline earth metal, such as for example, sodium hydroxide, potassium hydroxide, lithium hydroxide, sodium carbonate, calcium oxide, calcium carbonate, barium hydroxide, sodium sulfide, or heavy metal hydroxides, such as for example, zinc hydroxide, tin hydroxide, etc., or basic nitrogen compounds such as ammonia, amines, quaternary alkyl ammonium hydroxides. It is preferable to carry out the neutralization at a temperature of from about 100° F. to about 500° F., and preferably from about 200° F. to about 350° F., using stoichiometric amounts or more of the basic reagents.

The neutralization of the hydrolyzed phosphorus sulfide-hydrocarbon reaction product can be carried out before or after treatment with the adsorbent material.

The phosphorus sulfide-hydrocarbon reaction can be carried out in the presence of a sulfurizing agent as described in U. S. 2,316,087 issued to J. W. Gaynor and C. M. Loane April 6, 1943.

The following examples are illustrative of the herein described invention and are not intended as being indicative of the scope thereof:

EXAMPLE I

A butylene polymer having a molecular weight of about 700 was reacted with 15% $P_2S_5$ at a temperature of about 400° F. and the reaction product diluted with an equal volume of an SAE–10 base oil. The diluted product was then hydrolyzed with steam at a temperature of about 400° F. until the acidity of the product remained substantially constant with continued steaming. The hydrolyzed product had an acidity of 59 milligrams KOH per gram of product and a phosphorus content of 2.1%. The hydrolyzed product was then contacted with various amounts of Attapulgus clay fines for a period of two hours at a temperature of 340° F. The reduction in phosphorus content and acidity with various amounts of clay are shown in the following table:

*Table I*

| Percent Clay Fines | Acidity (Mg. KOH/gr.) | Percent Phosphorus |
|---|---|---|
| 0 | 59 | 2.1 |
| 0.5 | 41 | 1.73 |
| 1.0 | 37 | 1.43 |
| 2.5 | 32 | 1.31 |
| 5.0 | 27 | 1.09 |
| 10.0 | 20 | 0.91 |
| 20.0 | 16.5 | 0.93 |

The reductions in acidity and phosphorus content are due to the removal of inorganic phosphorus acids.

EXAMPLE II

A butylene polymer of about 700 molecular weight was reacted with 15% $P_2S_5$ at a temperature of about 400° F. to about 420° F., and the reaction product diluted with an equal volume of SAE–10 base oil. The diluted product was then hydrolyzed with steam at a temperature of about 400° F. until the acidity of the product remained substantially constant at 55 mg. KOH/gram of product with continued steaming. The hydrolyzed product was then contacted with 7.5% No. 1 Attapulgus clay fines for two hours at 355° F. The clay was then filtered off and the filtrate neutralized with aqueous potassium hydroxide. Prior to the clay contacting the hydrolyzed product had a phosphorus content of 2.1% and an acidity of 55 milligrams KOH per gram of product; after claying, the product had a phosphorus content of 1.35% and an acidity of 27 milligrams KOH per gram of product. Upon neutralization, the neutralized product had an alkalinity of one milligram KOH per gram of product and a phosphorus content of 1.35%.

EXAMPLE III

A butylene polymer having a molecular weight of about 700 was reacted with a mixture of 16.6% $P_2S_5$ and 2.4% sulfur at temperature of 400° F. to 410° F. for a period of 10 hours. The reaction product was then hydrolyzed with steam at a temperature of 370° F. to 398° F. for a period of 5½ hours until a constant acidity of 123 milligrams of KOH per gram of product was obtained. The hydrolyzed product was then contacted with 14.6% Attapulgus clay fines for a period of twenty hours during which time the temperature ranged from 340° F. to 220° F. The clay-treated product having an acidity of 41 mg. KOH/gram of product was diluted with about 65% of an SAE–10 oil, neutralized with 32% (based on $P_2S_5$-butylene polymer reaction product) of a 30% solution of barium hydroxide ($Ba(OH)_2.8H_2O$) at a temperature of 350° F. to 375° F., and then filtered through a Sweetland filterpress. The neutralized product had a sulfur content of 1.06%, a barium content of 5.37% and a phosphorus content of 1.91%, of which 1.51% was organic phosphorus.

EXAMPLE IV

A butylene polymer having a molecular weight of about 700 was reacted with 15.9% $P_2S_5$ at a temperature of 443° F. to 458° F. for ten hours. The reaction product was then hydrolyzed with steam at a temperature of 305° F. to 330° F. for a period of 5½ hours, at the end of which time the product had an acidity of 84 milligrams of KOH per gram of product, a sulfur content of 3.34%, and a phosphorus content of 4.37%, of which 3.9% was organic phosphorus. The hydrolyzed product was then contacted with Attapulgus clay fines for twenty-two hours at which time the temperature ranged from 315° F. to 260° F. After adding the clay, the mixture was diluted with 63% of a wax-free SAE–10 oil stock and filtered. The filtrate was neutralized with 34% barium hydroxide ($Ba(OH)_2.8H_2O$) at a temperature of 275° F. to 315° F. over a period of about 10½ hours. Before neutralization, but after claying, the acidity of the product was reduced from 84 milligrams KOH per gram of product to 35 milligrams KOH per gram of product. The neutralized product had a sulfur content of 1.35%, a barium content of 5.40%, and a phosphorus content of 2.04%, of which 1.82% was organic phosphorus.

EXAMPLE V

A butylene polymer of about 700 molecular weight was reacted with 15.9% $P_2S_5$ and 2.4% sulfur at a temperature of 400° F. to 423° F. for 9½ hours. Upon hydrolysis at a temperature of 384° F. to 392° F. over a period of 5½ hours the acidity of the product reached 107 milligrams of KOH per gram of product. The hydrolyzed product was then treated with 13.1% Attapulgus clay fines at a temperature ranging from 345° F. to 220° F., and the clay removed by filtration. The filtrate had an acidity of 42 milligrams KOH per gram of product. Upon neutralization with 4.3% potassium hydroxide at a temperature of 275° F. to 315° F., a product having a sulfur content of 0.7%, a potassium content of 2.75%, and a phosphorus content of 1.76%, of which 1.61% was organic phosphorus.

I have found that neutralization of the clayed, hydrolyzed product with lithium hydroxide produces a product which is unique in that the alkalinity of the neutralized product is believed to be due to peptized lithium hydroxide and not to the formation of basic salts of phosphorus, such as is obtained when the clayed, hydrolyzed product is neutralized with other alkali metal or other alkaline earth metal basic reagents. I have found it possible to obtain a product having an alkalinity as high as 100 milligrams of LiOH per gram of product by the addition of lithium hydroxide to the hydrolyzed clayed reaction product of a phosphorus sulfide and a hydrocarbon. Lubricant additives of high basicity are desirable and of value in lubricating oil compositions used in conjunction with fuels of high sulfur content to counteract the oxidation products, namely $SO_2$ and $SO_3$ which are deleterious to motor parts.

The neutralized reaction products of a hydrocarbon and a phosphorus sulfide, substantially free of salts of inorganic phosphorus acids, as above indicated, are particularly well suited for use as additives in lubricating oils used for the lubrication of internal combustion engines operating under severe conditions and with fuels of relatively high sulfur content. The improvement obtained is demonstrated by the data in Table II, which were obtained by subjecting the samples identified below to the Co-ordinating Research Council test designated "CRC Designation L–1–545, Test Procedure for Determining in an Engine the Effect of Engine Oils on Ring Sticking, Wear and the Accumulation of Deposits." This test is a 480 hour test in a normally aspirated, single cylinder, caterpillar diesel engine under conditions described in the above-identified test procedure.

The following samples were subjected to the above test:

SAMPLE 1

3.3% KOH neutralized reaction product of $P_2S_5$ and isobutylene polymer of about 700 molecular weight, not clay-contacted
0.75% sulfurized terpene
95.95% solvent-extracted SAE-30 base oil

SAMPLE 2

3.3% product prepared as in Example V
.75% sulfurized terpene
95.95% solvent-extracted SAE-30 base oil

SAMPLE 3

6.6% KOH neutralized reaction product of $P_2S_5$ and isobutylene polymer of about 700 molecular weight, not clay-contacted
1.5% sulfurized terpene
91.9% solvent-extracted SAE-30 base oil

SAMPLE 4

6.6% product prepared in Example V
1.0% sulfurized terpene
92.4% solvent-extracted SAE-30 base oil Table II

| Sample No. | Rating |
|---|---|
| 1 | Failed at 360 hours. |
| 2 | Pass at 480 hours. |
|  | Overall Rating |
| 3 | 3.3 |
| 4 | 7.9 |

The above data demonstrate the improvement obtained by using as lubricating oil additive the clay-treated hydrolyzed reaction product of a phosphorus sulfide and a hydrocarbon substantially free of salts of inorganic phosphorus acids.

Percentages given herein and in the appended claims are weight percentages unless otherwise noted.

Copending application, Serial No. 202,410, filed December 22, 1950, by Roger W. Watson and Morton Fainman, claims the removal of inorganic acids of phosphorus from the hydrolyzed reaction product of a phosphorus sulfide and a hydrocarbon by treating the hydrolyzed product with a basic alkaline earth compound.

While I have described my invention by reference to specific embodiments thereof, the same are given by way of illustration only, and are not intended as defining the breadth of the invention, which includes within its scope such modifications and variations as come within the spirit of the appended claims.

I claim:

1. In the preparation of an oil-soluble lubricant addition agent wherein a normally liquid hydrocarbon is reacted with about 1% to about 50% of a phosphorus sulfide at a temperature of from about 200° F. to about 600° F. and the resultant reaction product hydrolyzed at a temperature of from about 220° F. to about 500° F. whereby inorganic acids of phosphorus are formed, the improvement comprising contacting said hydrolyzed reaction product with an alkaline adsorbent material selected from the group consisting of fuller's earth, diatomaceous earth, bentonite, magnesite and bauxite, at a temperature of from about 100° F. to about 500° F. for a time sufficient to remove the inorganic acids of phosphorus formed by said hydrolysis, and separating said contacted liquid from said adsorbent, whereby an oil-soluble reaction product of a phosphorus sulfide and a normally liquid hydrocarbon, substantially free of inorganic acids of phosphorus, is obtained.

2. In the preparation of an oil-soluble lubricant addition agent wherein a normally liquid hydrocarbon is reacted with about 1% to about 50% of a phosphorus sulfide at a temperature of from about 200° F. to about 600° F., the resultant reaction product hydrolyzed at a temperature of from about 220° F. to about 500° F., whereby inorganic acids of phosphorus are formed, and the hydrolyzed reaction product neutralized with a basic reagent, the improvement comprising contacting the unneutralized hydrolyzed reaction product with an alkaline adsorbent material selected from the group consisting of fuller's earth, diatomaceous earth, bentonite, magnesite and bauxite, at a temperature of from about 100° F. to about 500° F. for a time sufficient to remove the inorganic acids of phosphorus formed by said hydrolysis, separating said contacted liquid from said adsorbent material, and neutralizing the adsorbent-contacted hydrolyzed product with a basic reagent, whereby an oil-soluble neutralized reaction product of a normally liquid hydrocarbon and a phosphorus sulfide, substantially free of salts of inorganic acids of phosphorus, is obtained.

3. The process of claim 2 in which the fuller's earth is Attapulgus clay.

4. The method of claim 2 wherein the basic reagent is a basic alkali metal compound.

5. The method of claim 2 in which the basic reagent is a basic potassium compound.

6. The method of claim 2 in which the basic reagent is a basic lithium compound.

7. The method of claim 2 in which the basic reagent is a basic alkaline earth.

8. The method of claim 2 in which the basic reagent is a basic calcium compound.

9. The method of claim 2 in which the basic reagent is a basic barium compound.

10. The method of claim 2 in which the basic reagent is a basic nitrogen compound.

11. The process of claim 2 in which the normally liquid hydrocarbon is an olefin polymer having a molecular weight of at least about 500.

12. The process of claim 11 in which the olefin polymer is a butylene polymer.

13. The process of claim 11 in which the olefin polymer is a propylene polymer.

14. In the preparation of an oil-soluble lubricant addition agent wherein a normally liquid hydrocarbon is reacted with about 1% to about 50% of a phosphorus sulfide at a temperature of from about 200° F. to about 600° F., the resultant reaction product hydrolyzed at a temperature of from about 220° F. to about 500° F., whereby inorganic acids of phosphorus are formed, and the hydrolyzed reaction product neutralized with a basic reagent, the improvement comprising contacting the unneutralized hydrolyzed reaction product with an alkaline adsorbent material selected from the group consisting of fuller's earth, diatomaceous earth, bentonite, magnesite and bauxite, at a temperature of from about 100° F. to about 500° F. for a time sufficient to remove the inorganic acids of phosphorus formed by said hydrolysis, separating said contacted liquid from said adsorbent material, and adding to the adsorbent-contacted hydrolyzed product at a temperature of from about 200° F. to about 500° F. lithium hydroxide in an amount sufficient to give a product having an alkalinity of from 1 to 100 milligrams lithium hydroxide per gram of product, whereby an oil-soluble lubricant additive substantially free of salts of inorganic acids of phosphorus is obtained.

References Cited in the file of this patent

UNITED STATES PATENTS

| Number | Name | Date |
|---|---|---|
| 1,615,646 | Penecke | Jan. 25, 1927 |
| 2,316,091 | White | Apr. 6, 1943 |
| 2,421,004 | Berger | May 27, 1947 |
| 2,516,119 | Hersh | July 25, 1950 |
| 2,534,217 | Bartleson | Dec. 19, 1950 |
| 2,560,544 | Bartleson | July 17, 1951 |
| 2,560,548 | Bartleson | July 17, 1951 |